United States Patent
Shpigelman et al.

(10) Patent No.: US 12,107,767 B2
(45) Date of Patent: Oct. 1, 2024

(54) SYSTEM AND METHOD FOR NETWORK RATE LIMITING

(71) Applicant: Mellanox Technologies Ltd., Yokneam (IL)

(72) Inventors: Yuval Shpigelman, Yokneam (IL); Idan Borshteen, Yokneam (IL); Noam Bloch, Yokneam (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 0 days.

(21) Appl. No.: 17/715,167

(22) Filed: Apr. 7, 2022

(65) Prior Publication Data

US 2023/0327998 A1    Oct. 12, 2023

(51) Int. Cl.
| | |
|---|---|
| *H04L 47/25* | (2022.01) |
| *H04L 43/106* | (2022.01) |
| *H04L 47/263* | (2022.01) |
| *H04L 47/283* | (2022.01) |

(52) U.S. Cl.
CPC ............ *H04L 47/25* (2013.01); *H04L 43/106* (2013.01); *H04L 47/263* (2013.01); *H04L 47/283* (2013.01)

(58) Field of Classification Search
CPC .................................................... H04L 67/108
USPC ........................................................ 709/246
See application file for complete search history.

(56) References Cited

U.S. PATENT DOCUMENTS

| | | | | |
|---|---|---|---|---|
| 6,115,357 A | * | 9/2000 | Packer | H04L 47/263 370/231 |
| 6,493,316 B1 | * | 12/2002 | Chapman | H04L 9/40 370/231 |
| 6,757,255 B1 | * | 6/2004 | Aoki | H04L 69/165 370/401 |
| 7,000,025 B1 | * | 2/2006 | Wilson | H04L 47/263 709/226 |
| 7,603,473 B2 | * | 10/2009 | Hester | H04L 12/66 370/468 |
| 8,995,268 B2 | * | 3/2015 | Siemens | H04L 47/283 370/235 |
| 10,873,533 B1 | * | 12/2020 | Ismailsheriff | H04L 47/29 |
| 10,917,352 B1 | * | 2/2021 | Hanes | H04L 69/16 |
| 11,616,730 B1 | * | 3/2023 | Schapira | H04L 47/26 370/235 |
| 2005/0018617 A1 | * | 1/2005 | Jin | H04L 47/283 370/252 |

(Continued)

OTHER PUBLICATIONS

"5.2 Reliable Byte Stream". Posted at <https:/book.systemsapproach.org/e2e/tcp.html> on Feb. 12, 2021 (Year: 2021).*

*Primary Examiner* — Scott B Christensen
(74) *Attorney, Agent, or Firm* — PEARL COHEN ZEDEK LATZER BARATZ LLP (57) ABSTRACT

A device and method may alter the transmission rate of data sent across a computer network based on a time to receive an acknowledgement in response to a packet sent over the network. An embodiment may transmit packets across the computer network according to a rate R, where R is determined based at least on a number of bytes to be sent during a window (cwnd) divided by a duration of time (RTT); and modify RTT based on a current round trip time of a packet sent over the network (e.g. based on a time to receive an acknowledgement in response to a packet sent over the network).

22 Claims, 3 Drawing Sheets

(56) References Cited

U.S. PATENT DOCUMENTS

| | | | |
|---|---|---|---|
| 2007/0008884 A1* | 1/2007 | Tang | H04L 9/40 370/230 |
| 2008/0037420 A1* | 2/2008 | Tang | H04L 69/163 370/231 |
| 2009/0097483 A1* | 4/2009 | Henocq | H04L 41/147 370/389 |
| 2009/0276271 A1* | 11/2009 | Munson | H04L 47/283 705/40 |
| 2009/0316579 A1* | 12/2009 | Tang | H04L 69/163 370/231 |
| 2012/0243410 A1* | 9/2012 | Vedula | H04L 63/0272 370/235 |
| 2014/0047141 A1* | 2/2014 | Sadeghi | G06F 5/12 710/56 |
| 2014/0348139 A1* | 11/2014 | Gomez Martinez | H04L 47/83 370/336 |
| 2017/0094296 A1* | 3/2017 | Gu | H04L 43/0864 |
| 2021/0152474 A1 | 5/2021 | Shpigelman et al. | |
| 2021/0152484 A1 | 5/2021 | Shpigelman et al. | |
| 2021/0203578 A1* | 7/2021 | Li | H04L 43/04 |
| 2023/0231810 A1* | 7/2023 | Schapira | H04L 65/80 370/235 |

\* cited by examiner

SYSTEM AND METHOD FOR NETWORK RATE LIMITING

FIELD OF THE INVENTION

The present invention relates to the field of data network congestion control, and more particularly in some embodiments to limiting the rate of data sent or exchanged on a computer data network.

BACKGROUND

Current methods of addressing computer data network congestion (e.g. too much data being transmitted on a network) include algorithms such as the Swift congestion control system (which may use a window, and a pacing mechanism) and HPCC (High Precision Congestion Control) mechanisms, which may include pacing-based rate limiting or window-based rate limiting.

Window based congestion control (also termed "sliding window" congestion control), e.g. used in transmission control protocol (TCP) systems, may operate based on outstanding transmitted data not received or acknowledged, in order to not overuse the capacity of a path between sender and receiver. For example, a window may be set at 100 bytes, such that the transmitting device will transmit 100 bytes and will not transmit the packet including the $101^{st}$ byte until it receives one ack (acknowledgement) corresponding to the packets including the bytes; in some sense packets may be counted in terms of the bytes they contain, and limited to X bytes per window. In order to adjust or alter the data transmission rate, the window may be adjusted; e.g. to cut the rate in half the window size of 100 may be set to 50.

Rate or pacing based limiting may focus on the data sent, and may transmit only a certain amount of data per time period, or one data item each time period. For example, a rate based congestion protocol may transmit N bytes (typically as packets) each x nanoseconds; and to reduce network load a system may simply double x.

Pacing or rate systems may have the benefits of spreading data evenly across time, in contrast to window systems which may be bursty, transmitting data in a start-stop manner. Thus rate based systems or pacing may help with buffers in a network. Window systems may have the benefits of being self adjusting, as the rate is changed continually based on the acks received, which is based on what the network can handle at a particular time. Rate based system do not self-adjust, but need to have a process adjust the rate if needed. Window systems may also factor in the round trip time for a byte or packet to be sent and an ack received: if time for this changes such a system may automatically adjust.

SUMMARY OF THE INVENTION

Some embodiments of the present invention may alter the transmission rate of data sent across a computer network based on a round-trip time (e.g. based on the time to receive an acknowledgement in response to a packet sent over the network). An embodiment may transmit packets across the computer network according to a rate R, where R is determined based at least on a number of bytes to be sent during a window (cwnd) divided by a duration of time (RTT); and modify RTT based on a current round trip time of a packet sent over the network. An embodiment may transmit packets across the computer network according to a rate R, where, for example, R=cwnd/RTT. RTT may be modified based on a time to receive an acknowledgement in response to a packet sent over the network, and cwnd may be updated based on for example the congestion state of the network. R may be updated based on such an example formula, for example in response to changes of underlying settings such as RTT.

An embodiment of the present invention may provide the benefits of both a windowing method (without being a windowing method) and also a pacing or rate system. Embodiments of the present invention may provide the advantages of window-based rate limiting by using only pacing-base rate limiters.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may extend hard-wired hardware congestion control, and may allow such systems to include the benefits of windowing congestion systems, without including a windowing system (or a windowing system in addition to an existing one). Embodiments of the invention may enforce a data rate for each of a set of connections, where the data rate is decrease when it is determined an acknowledgement to a sent packet takes longer to be received than a current round-trip-time parameter (indicating increased congestion), and the data rate is increased when it is determined an acknowledgement to a sent packet takes less time to be received than a current round-trip-time parameter (indicating decreased congestion). An embodiment may determine an actual round trip time for data sent across the computer network. Waiting for and determining the timing of the receipt of an acknowledgment packet may be used to measure actual round trip time, but other methods may be used as well. Based on the actual round trip time, a rate R may be determined to send data across the computer network, where R=constant/RTT. The constant may be a setting cwnd, examples of which are described below, or another constant or setting (which may be adjustable). Such a system may emulate a windowing system without using a windowing system.

Prior art windowing systems may directly control the window, or may directly control the number of bytes or packets sent and not acknowledged during a window, in contrast to embodiments of the present invention, which may instead control the rate in order to mimic some benefits of windowing. Embodiments of the present invention may input or observe round trip time of bytes or packets and use this to adjust a rate used in rate control. Thus embodiments may "imagine" it has a window but implement this "window" using rate control.

Figure 1:
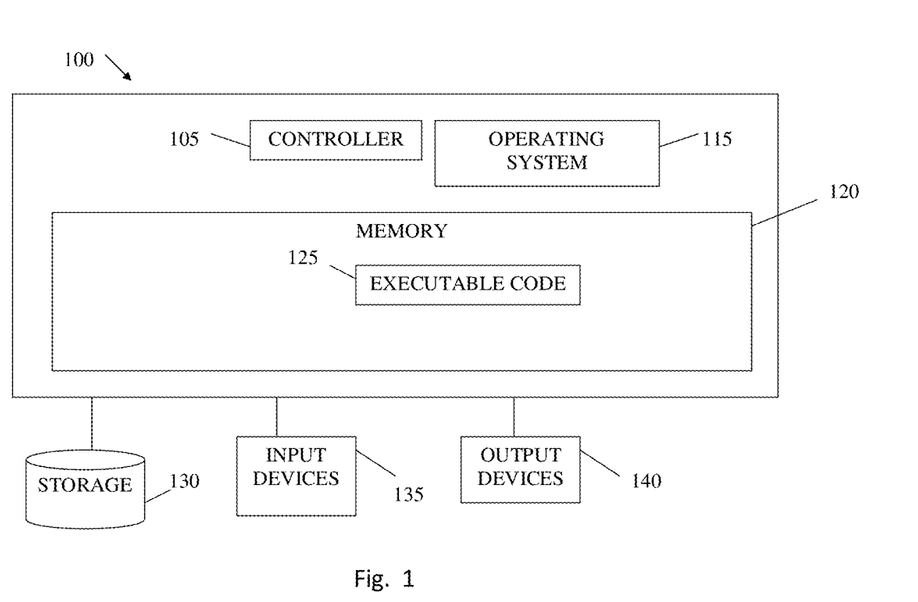
FIG. 1 is a block diagram of an exemplary computing device which may be used with embodiments of the present invention.

Reference is now made to FIG. 1, which is a block diagram of an exemplary computing device which may be used with embodiments of the present invention. Computing device 100 may include a controller, processing circuitry or processor 105 that may be, for example, a central processing unit processor (CPU), a chip or any suitable computing or computational device, an operating system 115, a memory 120, a storage 130, input devices 135 and output devices 140. Each of modules and equipment such as a MC, interface, or adapter; processes and/or devices transmitting data; and computer 220 may be, be executed by, or include a computing device such as included in FIG. 1.

Operating system 115 may be or may include any code segment designed and/or configured to perform tasks involving coordination, scheduling, arbitration, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a Flash memory, a volatile memory, a non-volatile memory, a cache, or other suitable memory units or storage units. Memory 120 may be or may include a plurality of, possibly different memory units. Memory 120 may store for example, instructions to carry out a method (e.g., code 125), and/or data.

Executable code 125 may be any executable code, e.g., an application, a program, a process, task or script. Executable code 125 may be executed by processing circuitry or controller 105 possibly under control of operating system 115. For example, executable code 125 may be an application which alters a transmission rate according to embodiments of the present invention. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 1 may be omitted.

Input devices 135 may be or may include a mouse, a keyboard, a touch screen or pad or any suitable input device. Any suitable number of input devices may be operatively connected to computing device 100 as shown by block 135. Output devices 140 may include one or more displays, speakers and/or any other suitable output devices.

Embodiments of the invention may include one or more article(s) (e.g., memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
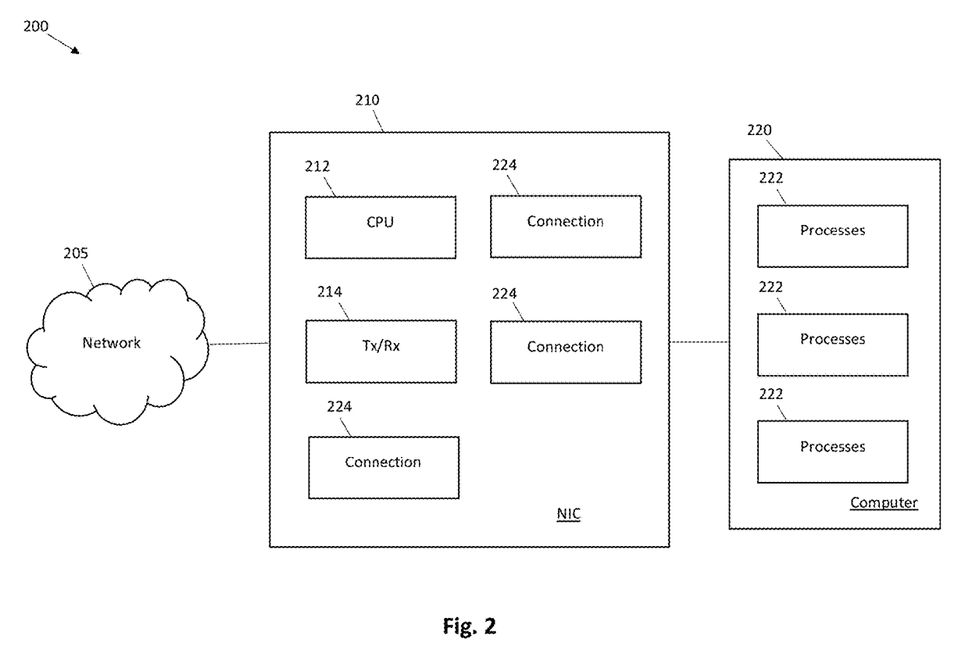
FIG. 2 is a block diagram of a system in which rate limiting may be performed according to some embodiments of the present invention.

Reference is now made to FIG. 2, which is a block diagram of a system in which rate limiting may be performed according to some embodiments of the present invention. System 200 may include a network interface controller (MC) or other physical network interface, adapter or network adapter 210, which in turn may include a processor 212, transmitting/receiving circuitry 214 which may include a pacing mechanism, and a memory or other components such as in a device of FIG. 1. Transmitting/receiving circuitry 214 may include for example a transmit pipe (TX) which receives a rate and acts by using a pacing mechanism, and a receive pipe (RX) which collects indications from the network such as acknowledgments or RTT measurement packets. A pacing mechanism within transmitting/receiving circuitry 214 may receive a rate (e.g. as determined by example Formula 1 herein) and may determine a delay between bytes, or packets containing bytes, sent by each queue pair or connection 224 managed by MC 210, thus enforcing the rate or pseudo-window according to embodiments of the present invention.

NIC 210 may connect multiple processes and/or devices 222 to a network 205, e.g. an intranet, data center network, an HIPC (high performance computing) network, the internet or another network. Processes 222, such as programs or applications, executed by computer 220, may transmit and receive data over network 205 via NIC 210, which may provide the interface between processes 222 and network 205. Within MC 210, a transmit pipe (TX) within transmitting/receiving circuitry 214 may enforce a rate using a pacing mechanism, transmit according to the rate and cause transmission. Computer 220 may include components such as those in FIG. 1. Each process 222 may correspond to or be assigned a specific, or one or more, connection(s) or queue pair(s) 224.

Computer 220 may be for example a server communicating with other servers in data center via a local network, a computer communicating with other remotely located computers over the internet, or other types of computers. MC 210 may be for example Mellanox ConnectX-6 VPI MCX653106A-HDAT network adapter, the NVIDIA® BlueField®-2 data processing unit, or another unit. While an example set of functions is assigned to an example set of hardware units as in FIG. 2, other types of hardware, organized differently, may carry out embodiments of the present invention.

Prior art systems may perform window or rate-based congestion control in hardware, e.g. via a NIC, and thus altering or augmenting such a congestion control system may be costly or difficult. For example, to augment a prior art rate-based system to add a window-based system may be expensive, as it would require hardware redesign. Embodiments of the current invention may allow a rate-based system implemented in hardware to (e.g. on a MC) to enjoy the benefits of a window system, without using an actual windowing system, and without adding a window to the hardware system, using an "algorithmic window". Embodiments may perform rate limiting without the need to alter existing hardware. Thus embodiments may be different in operations from systems which use both windowing and rate based systems: embodiments of the present invention may use a rate based system to mimic the effect of a windowing system, without using a windowing system. Such an "algorithmic window" may not actually count bytes or packets and force senders, in hardware, to stop sending after X bytes (typically sent as packets), as a windowing system does, but may have a similar effect and gain the benefits of a windowing system.

Embodiments of the invention may enforce congestion control at a sending or transmitting device (e.g. device NIC 210 of FIG. 2) by transmitting bytes or packets from that sending device across a computer network at a rate which is adjusted based on the "round trip" time between the transmitter to the receiver and back to the transmitter across a network (which may be based on the time to receive an acknowledgement), or the current round trip time of a packet sent over the network. The determinative acknowledgement may be the acknowledgement for a particular packet: e.g. round trip time may be measured by sending a packet and determining the time taken to receive an ack for that particular packet, as opposed to for a different packet. The packet used to measure round trip time may be a packet sent naturally, containing actual data, or may be a special probe packet. A rate may be determined based at least on a number of bytes to be sent during a window (e.g. cwnd) divided by a duration of time (e.g. RTT, or an updated RTT). A formula may be used to define or modify the rate the bytes or packets are sent, for example:

$$\text{Rate} = cwnd/RTT \quad \text{Formula 1}$$

Where Rate is the rate at which bytes or packets are sent (e.g. bytes/time); cwnd is setting or constant which may in some embodiments define a window, defined by the number of bytes transmitted per unit of time, or expressed as or defining a number of bytes which, if a windowing system were used, could be outstanding and not acknowledged during a period of time such as a period defined by RTT; and the setting RTT is a "round trip time", expressed as an amount of time, e.g. typically milliseconds. Cwnd may be varied, or may be a constant; a constant other than cwnd may be used. RTT may be a setting which may be updated or adjusted based on actual observed round trip time: thus RTT may be called "round trip time" but may be based on or derived from actual or observed round trip time. An initial RTT may be set (e.g. 10 milliseconds) and then adjusted up or down as needed. After adjustment of RTT, Rate may be recalculated based on the modified setting RTT. While cwnd defines a window, in a typical embodiment this window is not used to enforce an actual windowing regime (e.g. where transmission is stopped when window capacity is reached), but is instead used in a non-windowing manner as part of the rate that controlled by an algorithm.

In a system where a burst including a number of packets is sent, the rate may limit the time between bursts.

In other embodiments, formulas other than example Formula 1 may be used. In other embodiments, other units may be used, for example Rate, instead of bytes/time, may be packets/time; and cwnd may be expressed in packets.

A rate variable Rate may be used to control or alter the transmission rate of data sent across a network. For example, a MC may use or assign a different Rate calculated for each certain connection or queue pair (e.g. connections 224) to control the data rate transmitted on that connection, limiting the data rate to, rate bytes/second, for example. Typically the Rate is the rate of transmission, and received data may be sent based on a congestion protocol (if used) by the remote sender of received data. In one embodiment a transmission device (e.g. a MC) may ask a remote transmitter to send data at a certain rate, based on e.g. Formula 1 or other methods disclosed herein. Each device, e.g. device 222, may then transmit data (e.g. as packets) across the computer network (e.g. network 205) at the rate assigned to its connection 224; the rate possibly different for each connection 224. Periodically, or in response to an event such as congestion or a new connection being added to the network, RTT for each connection (e.g. each connection separately) may be modified based on a time to receive an acknowledgement in response to a packet sent over the network, and Rate for that connection may be recalculated. Modifying RTT may be based on a test packet; e.g. modification of RTT may be performed by sending a test packet across the network, and at a time or duration T after the sending of the test packet, where T>the current setting RTT, if the packet is not received, the setting RTT may be increased (typically for a test or probe packet the round trip time is measured based on time to receive the packet itself rather than an ack). In some embodiments this increase of RTT may occur very soon after the wait time T has passed RTT, and no wait for RTT to elapse may occur to decide to increase RTT. The packet sent need not be a test packet, e.g. it may be a packet sent in the normal course of network operation. Modifying RTT may also include reducing the setting RTT based on actual time to receive an acknowledgement.

Embodiments of the present invention may adjust the setting RTT based on the amount of time taken to receive an acknowledgement based on a transmitted packet (although typically RTT counts bytes). An "algorithmic window" may be enforced, by adjusting the rate, without actually using the windowing method of ceasing transmission until an ack is received for an Xth byte (within a packet). Embodiments may thus avoid stopping transmission when outstanding data per connection expires, as is done in windowing systems.

Calculating or adjusting a current RTT to produce an updated RTT based on the amount of time taken, or a delay, to receive an acknowledgement, based on a transmitted packet, may be done in different manners. Some embodiments may sample round trip or acknowledgement time for not every packet, rather periodically (e.g. every period of time defined by RTT) or every N packets (e.g. every 8K of data contained in packets, or every 8 packets, or another measure), or as an event driven process, e.g. when delays or congestion are observed (e.g. when Explicit Congestion Notification (ECN)).

An embodiment may measure not round one way delay or time to receive, and base RTT adjustments on this: for example, a transmitter may send a packet including a timestamp may be used by a receiver (which may have its clock synchronized with the transmitter) to calculate delay or time to receive. The receiver may send a packet or ACK back to the transmitter which includes the delay or time to receive. Based on the delay or time to receive RTT may be adjusted.

In some embodiments, a test packet may be sent in response to an ack or other response sent back to the transmitter from a receiving device: a transmitter may sent a packet to a receiver, and in response to an ack or received packet (e.g. including timestamp) send another test packet.

An embodiment may periodically or every N packets transmit from a sending device an RTT, test, ping or probe packet. A timing measurement based on this packet may be determined in various manners. For example, an embodiment may wait a duration of time equal to the setting RTT (or some fixed time RTT+X) after the test packet is transmitted, and then if acknowledgement of the text packet is not received by the expiration of the duration, increase the current setting RTT to produce an updated RTT to use in example Formula 1. In some embodiments the actual time of receipt of ack, or the actual round trip, may be ignored: what is used to increase RTT is the fact that an ack was not received after a certain duration. Other methods of RTT adjustment may be event driven, for example, based on the round-trip time for other packets, or detection of congestion.

If RTT is to be increased, it may be, for example, incremented by a fixed or predetermined amount, e.g. 1 microsecond, or a fixed percentage, e.g. 5%, or increased in another manner. For example, an algorithm may increase current RTT by X milliseconds or Y % if an ack for a test packet is not received within current RTT; or in another embodiment RTT may be increased by X milliseconds or Y % if congestion is detected. In another embodiment the current/old RTT may be replaced with the newly measured RTT. In some embodiments the new or updated RTT may be limited in the amount it differs from the current RTT, e.g. an algorithm may not reduce or increase current RTT more than 10% even if other aspects of the algorithm indicate such a change. Incrementing a fixed amount regardless of actual delay may have the benefit of avoiding large swings in RTT and rate in response to a momentary spike in roundtrip times: prior art windowing methods may suffer from reacting too quickly to momentary congestion.

In prior art window-based systems, real observed RTT changes due to network conditions, immediately altering the amount of data sent or preventing data from being sent, as opposed to embodiments of the present invention, which may observe a real RTT and in response change a factor, setting or variable RTT.

Embodiments may decrease RTT (and thus increase Rate) when needed. For example, RTT may be reduced when an actual observed round trip time is measured that is smaller than the current setting RTT (e.g. based on a sampled packet, based on a probe packet, or based on other measurements). The amounts or proportions the variable or setting RTT is decreased may be similar to those when variable or setting RTT is increased: for example if a probe packed is acknowledged in a shorter amount of time than the current setting RTT, the setting RTT may be reduced by a fixed amount, or a fixed percentage.

In some embodiments, during a test to compare an actual ack time to the setting RTT, RTT is either increased or decreased, and it is not the case that RTT is not adjusted in response to such a test or comparison. In other embodiments, a test or compare of actual ack time may result in no action taken. For example, the RTT setting may be increased if time to acknowledge is >RTT, and RTT is decreased if time to acknowledge is <RTT, with no action taken in the rare case that time to acknowledge is equal to RTT.

Some embodiments may also, independently of adjusting a rate to mimic a window (e.g. by adjusting variable or setting RTT), also adjust a window (e.g. a window defining an amount of data) expressed as cwnd in Formula 1, which may thus also alter the data transmission rate. Adjusting the window or cwnd does not mean the use of a full windowing algorithm, as adjusting cwnd is different from "full" windowing algorithms which stop transmission if a certain amount of bytes or number of packets have not received an ack. Rather cwnd is in some embodiments an input to a formula for a rate. Embodiments may alter cwnd in software, but other embodiments may alter cwnd in hardware. Embodiments may alter cwnd if for example more devices are added to the network, if another queue or queue pair is added to the MC, as a result of other congestion control measures being used, or for other reasons. Adjustment of a theoretical (but not used) window by altering a parameter such as cwnd need not be used in some embodiments, and may be performed independently of any adjustment to a variable or setting RTT. Adjusting cwnd may be performed by known congestion control methods, e.g. TCP congestion control methods, or a Swift or HPCC congestion control system.

Embodiments may determine rate and cwnd by software, e.g. processor 212 executing software. Actual RTT measurement may be triggered by executed software and done by hardware. A pacing mechanism which enforces a rate may be executed in hardware, e.g. a unit which is the scheduler of a NIC. However, in other embodiments, other units may perform such functions, and functions may be hardware instead of software, and vice versa.

In some embodiments, a setting RTT and rate are calculated by processor 212, and this rate is sent or published to transmitting/receiving circuitry 214, which may include a pacing mechanism. Transmitting/receiving circuitry 214 may calculate and set a window cwnd. Each of the components of Formula 1, e.g. cwnd and RTT, and rate, may be determined for each of a different queue pair (e.g. including a send queue and receive queue), socket or connection. Each of applications 222 in FIG. 2 may open a separate queue pair to communicate with a remote application. Thus, in some embodiments, a different rate may be assigned to and limit the rate of a different application 222, a different queue pair, etc. and the algorithmic window adjusting the rate may be performed on a per-connection basis.

Figure 3:
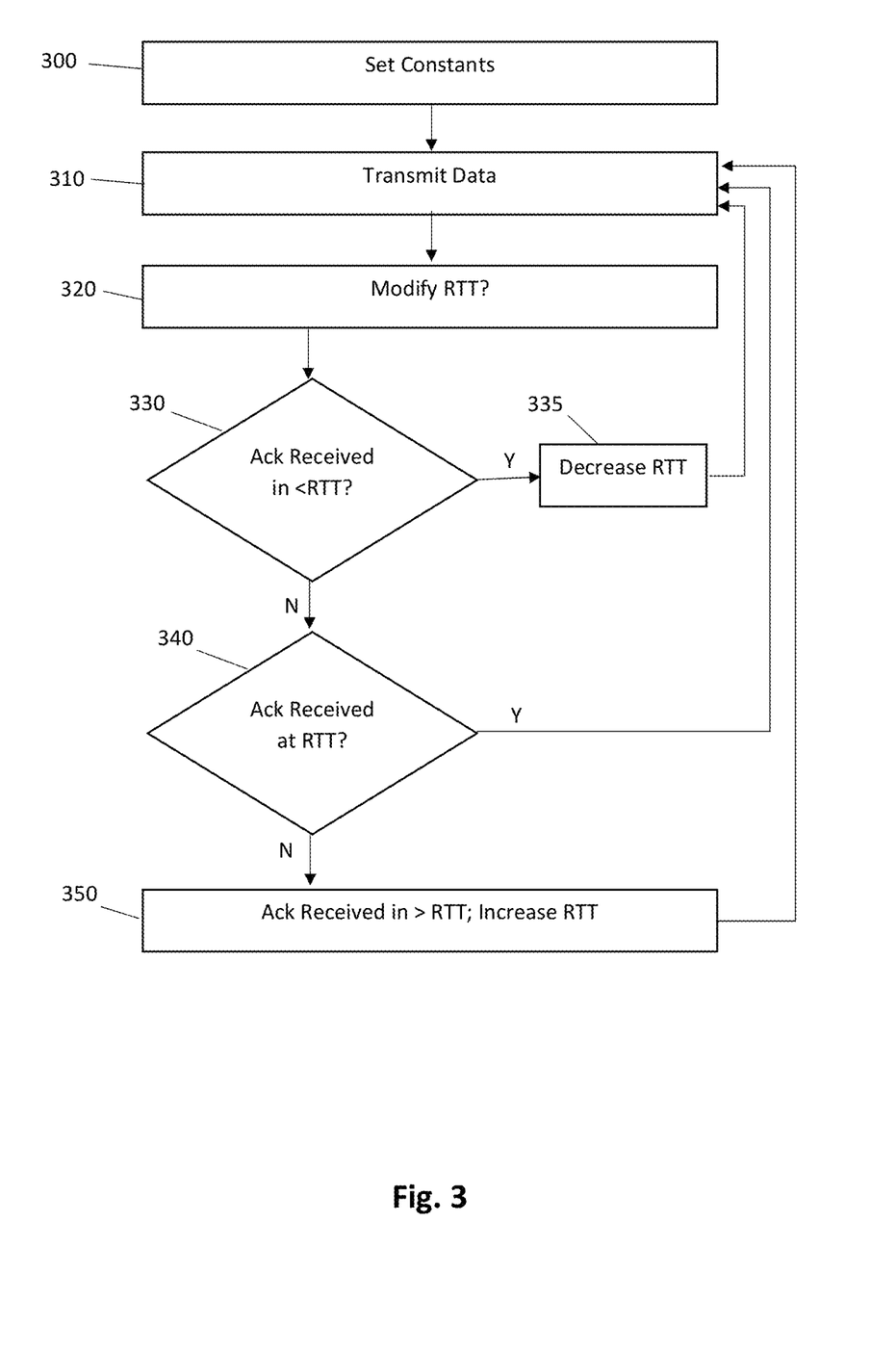
FIG. 3 is a flowchart of a method of computer data rate limiting, according to some embodiments of the invention.

Reference is now made to FIG. 3, which is a flowchart of a method of computer data rate limiting for sending data across a computer network, according to some embodiments of the invention. The operations of FIG. 3 may be performed using a computing device and system such as the examples shown in FIGS. 1 and 2, but may be performed with other hardware. In one embodiment, the operations of FIG. 3 are performed in a NIC such as MC 210, which may be for example a component of a server in a data center or server farm, but other components may perform operations according to embodiments of the invention, and the invention may be carried out in other environments.

In operation 300, an initial one or more constants or rates may be set; e.g. a constant or setting RTT may be set to a certain round-trip time constant, an initial cwnd may be calculated, etc. Each of the initial RTT and cwnd may be determined for each of a different connection: thus operation 300 may be performed in response to a new connection (e.g. queue pair) being created. Altering RTT to set a rate as in the operations of FIG. 3 may be performed for each of a plurality of connections, such that each connection has a different RTT, rate Rate, and cwnd (e.g. in some embodiments each connection has a cwnd calculated for that connection).

In operation 310, data, e.g. in the form of bytes, packets (typically containing bytes) or other forms may be sent or transmitted across the computer network. This transmission may be done according to a rate Rate, where Rate=cwnd/RTT, as discussed with respect to example Formula 1. The calculated or assigned Rate may be different for each connection. Transmission may be effected or caused by for example transmitting/receiving circuitry 214, or other units.

In operation 320, it may be determined if or how RTT should be modified. This may be performed periodically, or in response to an event, e.g. congestion or a new connection being added to the network. Modification may be based on actual time to receive an acknowledgement in response to a packet sent over the network. For example, in operation 320, a packet may be transmitted (e.g. a packet that includes data, as part of normal network operation, or a test or ping packet).

In operation 330, if an acknowledgement to the specific packet transmitted in operation 320 (e.g. not to another, different packet) is received in less time than the time described by setting RTT, in operation 335 RTT may be decreased (e.g. by a fixed increment, or by a percentage), Rate in example Formula 1 may be recalculated to alter the Rate, and processing may proceed to operation 310. This may have the effect of modifying rate and RTT by: if before a time corresponding to setting RTT elapses an acknowledgement to the packet is received, decreasing setting RTT. If an acknowledgement is not received in less time than RTT, processing may proceed to operation 340.

In operation 340, if an acknowledgement to the packet transmitted in operation 320 is received at the time defined by RTT (e.g. not early and not late), RTT may be unchanged, and processing may proceed to 310; if not, processing may proceed to operation 350.

In operation 350, since it has been determined that a period of time has passed since the packet sent in operation 320, with no ack, the period of time being greater than the duration defined by the setting RTT, the setting RTT may be increased, e.g. by a fixed increment, or a percentage or fraction of RTT; Rate in example Formula 1 may then be recalculated or altered. Processing may proceed to operation 310. Modifying a value RTT based on a current round trip time of a packet sent over the network may be performed repeatedly or continuously. For example, RTT may be incremented or increased by a percentage in response to an ack not being received; a process may wait a period of time, and if the ack is still not received, RTT may be incremented or increased again, and this process of gradually increasing RTT may repeat until an ack is received. Operation 350 may be carried out by waiting until a time after the sending of a packet, where the time is greater than RTT, and if no acknowledgement to that packet is received at that time, increasing RTT.

Other or different operations may be carried out.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method of altering the transmission rate of data sent across a computer network, the method comprising:
   determining a window (cwnd), wherein the window defines a number of bytes transmitted per unit of time as a constant;
   determining a setting expressing a period of time;
   determining a rate R based at least on the determined cwnd divided by the setting;
   transmitting a first set of packets across the computer network according to the rate R;
   modifying the setting based on a first round trip time of a first packet sent over the network; and
   for each of one or more second sets of packets:
      adjusting the rate R based on the determined cwnd divided by the modified setting;
      transmitting the second set of packets according to the adjusted rate R; and
      modifying the setting based on a second round trip time of a second packet sent over the network.

2. The method of claim 1, wherein the round trip time is based on sending a test packet across the network.

3. The method of claim 1, wherein the round-trip time is based on receiving an acknowledgement in response to the first packet sent over the network.

4. The method of claim 1, comprising assigning a different rate R for each of a plurality of connections.

5. The method of claim 1, wherein modifying the setting comprises, at a time after the sending of the first packet, where the time is greater than the setting, if no acknowledgement to the first packet is received, increasing the setting.

6. The method of claim 5, wherein the setting is increased by a fixed amount.

7. The method of claim 1, wherein modifying the setting is based on a time to receive an acknowledgement in response to the first packet sent over the network and wherein, at a time after the sending of the first packet, if before a time described by the setting an acknowledgement to the first packet is received, decreasing the setting.

8. The method of claim 1, wherein the round trip time is a is a current round trip time.

9. A system for altering the transmission rate of data sent across a computer network, the system comprising:
   a memory; and
   processing circuitry to:
      determine a window (cwnd), wherein the window defines a number of bytes transmitted per unit of time as a constant;
      determine a setting expressing a period of time;
      determine a rate R based at least on the determined cwnd divided by the setting;

cause the transmission of a first set of packets across the computer network according to the rate R;

modify the setting based on a round trip time of a packet sent over the network; and for each of one or more second sets of packets:

adjust the rate R based on the determined cwnd divided by the modified setting;

transmit the second set of packets according to the adjusted rate R; and modify the setting based on a second round trip time of a second packet sent over the network.

10. The system of claim 9, wherein:

the round trip time is based on sending a test packet across the network.

11. The system of claim 9, wherein the round trip time is based on receiving an acknowledgement in response to the first packet sent over the network.

12. The system of claim 9, wherein the controller is to assign a different rate R for each of a plurality of connections.

13. The system of claim 9, wherein modifying the setting comprises, at a time after the sending of the first packet, where the time is greater than the setting, if no acknowledgement to the first packet is received, increasing the setting.

14. The system of claim 13 wherein the setting is increased by a fixed amount.

15. The system of claim 9, wherein modifying the setting is based on a time to receive an acknowledgement in response to the first packet sent over the network and wherein, at a time after the sending of the first packet, if before a time described by the setting an acknowledgement to the first packet is received, decreasing the setting.

16. The system of claim 9, wherein the round trip time is a is a current round trip time.

17. A method of transmitting on a computer network, the method comprising:

repeatedly, for each of a set of data;

sending data according to a rate R=window (cwnd) defining a number of bytes transmitted per unit of time as a constant/RTT;

determining an actual round trip time for data sent across the computer network;

based on the actual round trip time, determining an updated RTT; and determining an updated rate R to send data across the computer network, where updated R=_cwnd /updated RTT.

18. The method of claim 17 wherein the actual round trip time is based on sending a test packet across the network.

19. The method of claim 17, comprising assigning a different rate R for each of a plurality of connections.

20. The method of claim 17 wherein determining RTT comprises, at a time after the sending of a packet, where the time is greater than RTT, if no acknowledgement to the packet is received, increasing RTT.

21. The method of claim 17 wherein modifying RTT comprises, at a time after the sending of a packet, if before a time RTT an acknowledgement to the packet is received, decreasing RTT.

22. A method of altering the transmission rate of data sent across a computer network, the method comprising:

determining a setting expressing a period of time;

determining a rate R based at least on a number of bytes to be sent during a window (cwnd) divided by the setting;

transmitting packets across the computer network according to the rate R;

modifying the setting based on a round trip time of a packet sent over the network; and for each of at least one time period subsequent to the transmitting packets:

updating the setting based on network conditions;

updating the rate R based at least on the cwnd divided by the updated setting; and transmitting additional packets across the computer network according to the updated rate R.

* * * * *